US007796961B2

(12) United States Patent
Karlsson

(10) Patent No.: US 7,796,961 B2
(45) Date of Patent: Sep. 14, 2010

(54) METHOD AND APPARATUS FOR DETECTING THE PRESENCE AND LOCATIONS OF RADIO CONTROLLED IMPROVISED EXPLOSIVE DEVICES IN REAL TIME

(75) Inventor: Lars Karlsson, Santa Clara, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 905 days.

(21) Appl. No.: 11/332,801

(22) Filed: Jan. 12, 2006

(65) Prior Publication Data

US 2009/0243818 A1 Oct. 1, 2009

Related U.S. Application Data

(63) Continuation-in-part of application No. 10/829,858, filed on Apr. 21, 2004, now abandoned, and a continuation-in-part of application No. 11/201,164, filed on Aug. 11, 2005, and a continuation-in-part of application No. 11/201,144, filed on Aug. 11, 2005, now abandoned.

(60) Provisional application No. 60/643,518, filed on Jan. 12, 2005.

(51) Int. Cl.
*G06F 3/033* (2006.01)

(52) U.S. Cl. .................... 455/130; 455/101; 455/150.1; 455/567

(58) Field of Classification Search .................. 455/130
See application file for complete search history.

(56) References Cited

U.S. PATENT DOCUMENTS 5,682,168 A * 10/1997 James et al. ................ 343/713
6,777,228 B2 * 8/2004 Lejeune .................. 435/309.1
7,035,311 B2 * 4/2006 Nohara et al. ............... 375/132
2004/0214598 A1 * 10/2004 Parameswaran Rajamma ... 455/556.1
2005/0107048 A1 * 5/2005 Saunders et al. ............ 455/101
2007/0155438 A1 * 7/2007 Tischer ....................... 455/567

* cited by examiner

*Primary Examiner*—Duc Nguyen
*Assistant Examiner*—Ajibola Akinyemi

(57) ABSTRACT

A Method and Apparatus for Detecting the Presence and Locations of Radio Controlled Improvised Explosive Devices in Real Time. The system will clandestinely detect the presence and location of RCIED's along roadways in real time. This "RCIED Street Sweeper" system consequently allows its users to remove the explosive devices, pre-detonate them, or simply avoid the location so that the weapons cannot be used against a convoy or other important target. The system has the abilities (disclosed in U.S. patent application Ser. No. 10/829,858) to conduct fast wideband scanning of the RF spectrum looking for ambient RF signals as well as RCIED leakage signals. Furthermore the system has the ability to correlate the received leakage signals with the ambient RF signal environment, in order to verify authenticity. Still further, the system has the ability to continually mark and record the precise map location where each of those RF spectrum measurements emanated, including the relative distances between them. Still further, the preferred system will calculate adjusted curve profiles given the real time distance data. Fifth, the preferred system needs to have the ability to correlate sets of trend data with the adjusted curve profiles to determine matches. Further yet, the system alerts the vehicle driver to the presence and location of any RCIED that is detected by the system. Finally, the system is capable of being installed in a low profile, clandestine manner on a mobile platform such as a car or truck, so as not to alert insurgents of its existence.

19 Claims, 2 Drawing Sheets

METHOD AND APPARATUS FOR DETECTING THE PRESENCE AND LOCATIONS OF RADIO CONTROLLED IMPROVISED EXPLOSIVE DEVICES IN REAL TIME

This application is a continuation-in-part of application Ser. No. 10/829,858, filed Apr. 21, 2004, now abandoned and Ser. No. 11/201,164, filed Aug. 11, 2005, and Ser. No. 11/201,144, filed Aug. 11, 2005, now abandoned.

This application is filed within one year of, and claims priority to Provisional Application Ser. No. 60/643,518, filed Jan. 12, 2005.

BACKGROUND OF THE INVENTION

1. Field of the Invention

This invention relates to electronic information surveillance and security systems and, more specifically, to a Method and Apparatus for Detecting the Presence and Locations of Radio Controlled Improvised Explosive Devices in Real Time.

2. Description of Related Art

According to public press releases, recent asymmetrical warfare theaters have seen a dramatic increase in the use of radio controlled improvised explosive devices (commonly known and hereinafter referred to as "RCIED's") by insurgents and other hostile militants. The insurgents have been utilizing various types of RCIED's to fight guerilla warfare because they are highly effective, despite their low cost and low-tech design. These weapons are proving to be quite effective against an occupying force that must use the established public roadways as transfer routes for personnel, equipment, and other supplies. Typically, these RCIED's are hidden along or underneath roadways and streets; when a convoy or other important vehicular target approaches within striking distance of the RCIED(s), the insurgents detonate them. Detonation is initiated from a safe distance within radio signal range, causing significant damage and casualties to the targets but not to the initiators. This is proving to be a serious problem for U.S. and Coalition forces and must be addressed with a new type of real time detection technology.

What is needed is a device and method that provides the ability to "sweep" through roadways and streets, ahead of a convoy (for example), in a clandestine manner.

The requirement for a clandestine and disguised packaging of the system is important due to the fact that insurgents must not know that the friendly forces have the technology to detect and map out the insurgents' RCIED weapons after they are hidden on streets.

In addition to being applicable for military tactical operations, such a technology would be extremely useful to the Department of Homeland Security, the Secret Service, the Central Intelligence Agency, etc. Through use of such a system, the local roadways and streets traveled by leaders and VIP's can be swept of any possible RCIED's that had recently placed there by terrorist groups.

In order to feasibly detect RCIED leakages (that can be radiating on any frequency) as efficiently as possible, a System that has the following attributes is needed: 1) The abilities stated in the aforementioned U.S. patent application to do extremely fast wideband scanning for signal energy across wide ranges of the RF spectrum; 2) The real-time ability to do comparisons between received leakage signals and the received ambient RF environment; 3) The real-time ability to mark and keep track of the relative locations where each of RF spectrum signal emanated; 4) The real-time ability provide operators with alarms and indications that a possible RCIED has been detected its approximate location; 5) The ability to pick up and use the vehicle's distance traveled from measurement to measurement to account for speed variances; and 6) The ability to be installed in a low profile, clandestine manner on a mobile platform such as a car or truck so as not to alert insurgents of its existence.

SUMMARY OF THE INVENTION

In light of the aforementioned problems associated with the prior devices and methods used by today's military organizations, it is an object of the present invention to provide a Method and Apparatus for Detecting the Presence and Locations of Radio Controlled Improvised Explosive Devices in Real Time.

It is an object of the present invention to provide a system that will clandestinely detect the presence and location of RCIED's along roadways in real time. Such an "RCIED Street Sweeper" system would then allow users to remove the explosive devices, to pre-detonate them, or simply to avoid the location so that the weapon cannot be used against a convoy or other important target.

The preferred system needs to have the abilities stated in U.S. patent application Ser. No. 10/829,858 to do fast wideband scanning of the RF spectrum looking for ambient RF signals as well as RCIED leakage signals. Second, the preferred system needs to have the ability to correlate the received leakage signals with the ambient RF signal environment, in order to verify authenticity. Third, the preferred system needs to have the ability to continually mark and record the precise map location where each of those RF spectrum measurements emanated, including the relative distances between them. Fourth, the preferred system needs to have the ability to calculated adjusted curve profiles given the real time distance data. Fifth, the preferred system needs to have the ability to correlate sets of trend data with the adjusted curve profiles to determine matches. Sixth, the preferred system must alert the driver as to the presence and location of the RCIED that is detected by this method. Finally, the preferred system needs to be installed in a low profile, clandestine manner on a mobile platform such as a car or truck, so as not to alert insurgents of its existence.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Method and Apparatus for Detecting the Presence and Locations of Radio Controlled Improvised Explosive Devices in Real Time.

The parent applications to this patent application, namely, Ser. No. 10/829,858, filed Apr. 21, 2004 for "Method and Apparatus for the Intelligent and Automatic Gathering of Sudden Short Duration Communications Signals" and two of its continuation-in-part applications, namely, Ser. No. 11/201,164 filed Aug. 11, 2004 for "Improved Method and Signal Intelligence Collection System That Reduces Output Data Overflow in Real-Time", and Ser. No. 11/201,144 filed Aug. 11, 2004 for "Method and Technique For Gathering Signal Intelligence of All Radio Communications Only Originating From Specific Selected Areas" describe other application environments for the detection apparatus, system and method utilized by the present invention to monitor and localize the electronic emissions in a particular installation or compound. While the inventions disclosed in these three parent patent applications are not associated with the detection and localization of RCIED's (such as is the case with the instant invention/disclosure), the detection systems are essentially the same, and therefore the disclosures contained within those three parent applications are incorporated herein by reference, and will be referred to as the "parent applications" later in this document.

Figure 1:
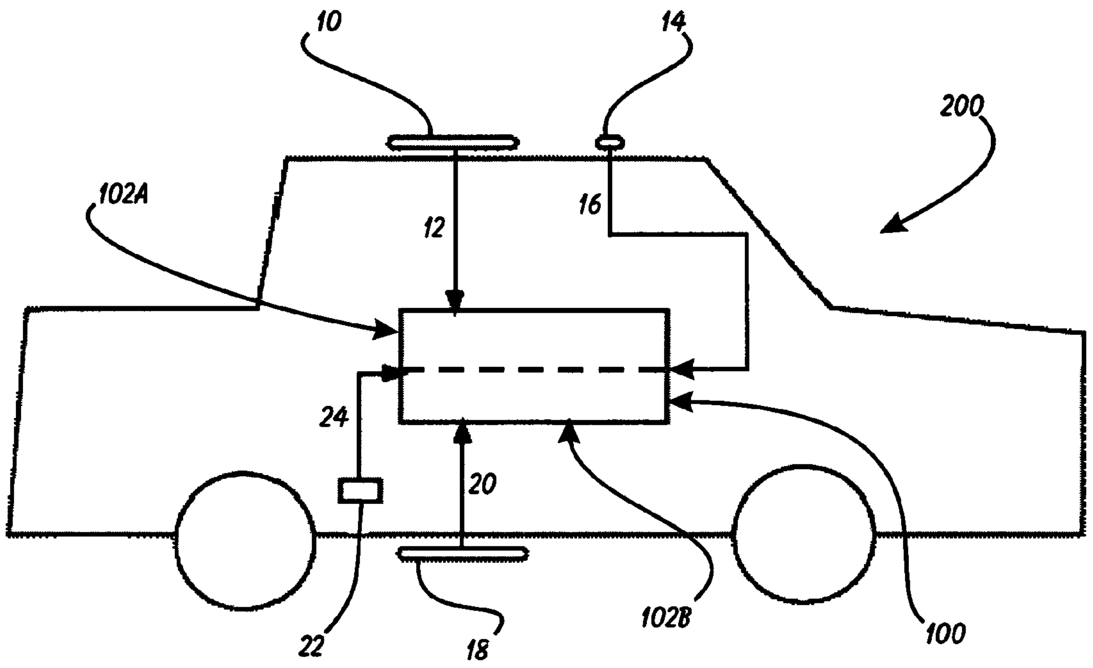
FIG. 1 is a block diagram of vehicle-based installation of the device of the present invention.

The present invention can best be understood by initial consideration of FIG. 1. FIG. 1 is a block diagram of vehicle-based installation 200 of the device of the present invention. Note that the locations of the antennas 10 and 18 are of extreme importance to the functioning of the invention. The drive shaft sensor 22 is installed and integrated with the system 200 to determine the distance between each measurement as it is taken.

A flat antenna 18 is mounted underneath the vehicle, facing downwards. This close-to-the-ground antenna (hereafter referred to as the "bottom antenna") 18 is used to pick up the leakage signals emanating from the RCIED's in the street or along the sides of the street.

The antenna mounted on the top of the vehicle is also a flat antenna (hereafter referred to as the "top antenna") 10. It is mounted on top in a way that is indiscreet and does not have a high profile. The top antenna 10 is used to detect the ambient RF environment for comparison with the bottom antenna's 18 received signals.

Both antennas 10, 18 feed into a Central Processor 100 that will do all of the signal detection and processing. Each antenna 10, 18 feeds into it's own respective receiver subsystem 102. These receiver subsystems 102 (wideband signal detection systems) are sophisticated receiving systems that are described in the aforementioned U.S. patent application Ser. No. 10/829,858. The receiver subsystems 102 are phase locked to each other through the GPS time reference signals. Thus, each receiver subsystem 102 will output data in a synchronized fashion for direct comparison. The only difference between the two internal receiver subsystems 102A and 102B are the fact that one is attached to the top antenna 10 (the "ambient RF receiver subsystem" 102A), and one is attached to the bottom antenna 18 (the "RCIED receiver subsystem" 102B).

A standard drive shaft sensor 22 is placed inside the vehicle at the appropriate location along the drive shaft. This sensor 22 also feeds into the Central Processor 100. The data is used to "distance tag" the relative distances between where each radio frequency (RF) measurement was taken by the receiver subsystems 102. This is described further in the following section.

Finally, a GPS antenna 14 is located atop of the vehicle 200 and the signals incoming thereto are routed into the Central Processor 100 where a GPS receiver is located. These signals are also used to "geolocation tag" the relative positions where each RF measurement is taken. Also, as mentioned, the GPS time receiver also supplies an accurate way to synchronize the two receiver subsystems 102A and 102B.

One substantial benefit of this vehicle design is that the use of low-profile flat antennas enables the invention to be loaded in vehicles that appear to be unmodified civilian vehicles. If we now turn to FIG. 2, we can examine how the system of the present invention executes its method.

Figure 2:
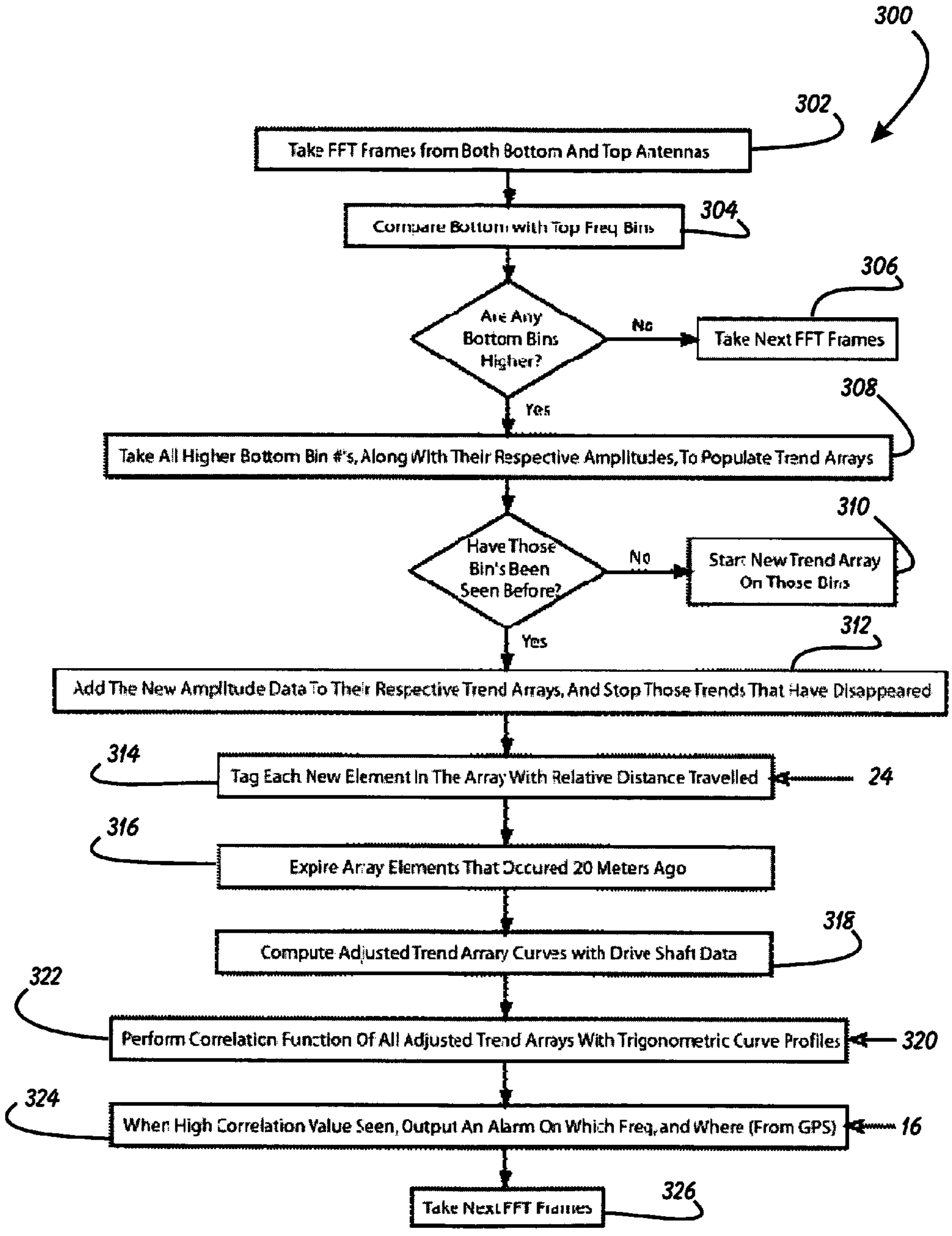
FIG. 2 is a flowchart depicting the signal processing method employed by the present invention.

FIG. 2 is a flowchart depicting the signal processing method 300 employed by the present invention. It describes how data is taken, processed, calculated, and correlated throughout the process to determine whether or not an RCIED has been detected, and if detected, where the RCIED is located. The figure displays how data is taken and the various signal-processing stages the invention goes through to determine whether or not an RCIED was passed over by the RCIED Street Sweeper. This processing is done in real-time.

This invention is unique since no other device has the capability or performance to perform these sophisticated signal detection and processing operations in real-time.

DIAGRAM REFERENCE NUMERALS

10 Top Flat Antenna
12 RF Environment Signals
14 GPS Antenna
16 GPS Signals
18 Bottom Flat Antenna
20 RCIED Leakage Signals
22 Drive Shaft Sensor
24 Drive Shaft Signals
100 Central Processor
102A Ambient RF receiver subsystem
102B RCIED receiver subsystem
200 RCIED Street Sweeper Vehicle Operation RCIED's are simply common explosives that are rigged to detonate upon receiving the proper wireless signal. This requires both a simple transmitter and a simple receiver device that is electrically connected to the detonator and explosive charge. A technical challenge is that the receiver devices can be tuned to any frequency that the transmitter/receiver pair is capable of. Thus, the frequencies that the RCIED's will use are numerous and unknown. This means that their internal local oscillators or super-regenerative circuits (electronic circuitry components of a radio receiver necessary to downconvert a received signal) are also unknown. The system of the present invention is capable of quickly detecting the low power, unintended signal leakage energy of those local oscillators or super-regenerative circuits. Hereafter in this patent application, such signal leakage energy will be simply referred to as "leakage". Leakages are inadvertently radiated from all commercial low-end receiver designs, and such designs are almost exclusively used by RCIED's. These leakages are very low in signal strength, which makes them difficult to discern in an environment full of various stronger radio signals. But the method of this system accounts for this discrimination issue.

The invention is installed in the RCIED Street Sweeper vehicle 200 in the configuration shown of FIG. 1. The top antenna 10 and bottom antenna 18 are situated properly and are connected to the receiver subsystems 102A and 102B of the central processor 100. The drive shaft sensor 22 is connected and also feeds into the central processor 100. Finally, the GPS antenna 14 feeds into the GPS time sensor of the central processor 100.

As the vehicle 200 proceeds down the street, the receiver subsystems 102 of the central processor 100 are programmed to scan through a wide range of RF frequencies in synchronous fashion. Again, the operations of the receiver subsystems 102 (hereafter referred to as "Wideband Systems") are exactly the same as described by U.S. patent application Ser. No. 10/829,858.

The wideband systems 102 digitize large bandwidths of the RF spectrum for processing. One wideband receiver subsystem 102A is attached to the top antenna 10 and one wideband receiver subsystem 102B is attached to the bottom antenna 18. Every time each receiver subsystem 102 produces a single n-point Fast Fourier Transformation (FFT) frame of information, both frames are sent to an algorithm that quickly compares those frames. An n-point FFT frame is comprised of n number of frequency measurements, or "bins" across the entire bandwidth.

As the FFT frames are collected from both bottom and top antennas 302, the bins of one of the ambient RF receiver subsystem 102A FFT frames are compared to the corresponding bin of the RCIED receiver subsystem 102B FFT frame that is taken at the same instant in time 304.

The signals that come in from the wideband receiver subsystem 102A connected to the bottom antenna 18 will be different than the signals coming from the wideband receiver subsystem 102B connected to the top antenna 10 due to numerous factors. In most cases, the signals from the top antenna 10 will have higher amplitudes than the signals from the bottom antenna 18 since the bottom antenna is facing towards the ground and thus is more isolated from the surrounding RF environment. The only time the FFT bin amplitudes from the bottom antenna 18 should be higher than the bin amplitudes from the top antenna 10 will be when a leakage signal from an RCIED is detected underneath (or beside) the vehicle 200. It is this phenomena that is exploited by the system of the present invention.

Continuing forward, the system 100 calculates which bins received from the bottom antenna 18 have higher amplitudes than the corresponding top antenna's 10 FFT bins 308. If the bins from the bottom subsystem 102B are not higher in amplitude than the corresponding bin of the top subsystem 102A, then the next FFT frames are processed 306.

As high-amplitude bins are detected by the system 100, the system 100 takes those higher bins and labels them as "bins of interest". These bins of interest and their respective amplitudes from the bottom antenna only, are then taken to another algorithm that begins to populate "trends" 308 which are finite numerical arrays of the amplitude data from one particular frequency bin number. Each element in these trend arrays is a successive frequency measurement (amplitude data from the bottom antenna, for a single bin of interest) over time.

If the FFT bins of interest have been seen before, i.e. trends have already been started for those bin numbers, then the new data points are simply placed into the end of those trend's arrays 312. If a bin of interest corresponds to a trend that has not been started before, then a new trend is begun 310. Finally, if existing trends do not have new data to add, that means that the signal amplitude from the bottom antenna 18 have ceased to be higher than the amplitude of the corresponding signals from the top antenna 10 for those particular trend's bin numbers (i.e. the signal eventually went away or the original trend was started on bad data). In such cases of trend dissipation, the system 100 will conclude that the trend is no longer of interest after the expiration of a specified period of time, as configurable by the system user 312.

The next step is to tag each new added element, of each trend, with a "distance tag" 314. This distance tag number comes from the drive shaft sensor algorithm, and is based upon an input from the drive shaft sensor that includes the sensor data 24. An algorithm calculates the relative distance the vehicle 200 traveled from when one measurement was taken to the very next. All data elements in an array that were recorded and are older than, for example, 20 meters are discarded 316. This is because it is necessary to bind the length of the trend arrays for the next stage of the signal processing, which is adjustment, after which comes correlation.

The trends are constantly "adjusted" with the distance tags 318. If the speed of the vehicle were constant, then the plotted curve (amplitude vs time) of the trend would be perfectly symmetrical and more or less bell shaped. For example, as the vehicle draws close to an RCIED, the RCIED leakage energy level detected would initially be low. The energy would continually increase until its peak (maximum detected power would be when the vehicle is directly over, or perpendicular, to the RCIED). Then the reverse would happen as the vehicle moves away from the RCIED. Plotted over time, the amplitude vs time graph would appear as a trigonometric bell curve.

The algorithm takes the actual trend curve data and adjusts it to reflect what the curve would look like if the speed of the vehicle were constant. The drive shaft signals 24 provide the data necessary to determine how much distance the vehicle has traveled from measurement point to measurement point. Thus, an adjusted trend curve can be calculated continually given a 20-meter traverse and corrected for the variant speeds engaged over those 20 meters (or other desired standardized distance). The adjusted trend curve result is then correlated with a set of standard trigonometric bell curves 322, as they would look if the RCIED receiver were located at various distances from the vehicle's centerline (i.e. how far left or right was the RCIED from the center of the vehicle when it drove by). These trigonometric bell curves 320 are theoretical curves given a constant speed of the vehicle, and varying only by the distance the RCIED is from the vehicle (how far left or right from the center of the vehicle when it drives by).

When a high correlation reading is calculated between one of the adjusted trend arrays and the trigonometric curve profiles, an alarm is sounded that alerts the driver that an RCIED was passed over approximately 10 meters behind, and at what frequency (the bin number) 324. By incorporating the GPS locating data 16, the system will give the GPS location of when the peak amplitude data was recorded in that trend and the approximate distance from the vehicle's centerline (by comparing which particular trigonometric curve profile gave the highest correlation value, corresponding to how far the distance is from the vehicle's centerline).

The correlation threshold to sound an alarm is programmable and can be set in the field. Once an alarm sounds the information can be relayed back to the convoy behind it through tactical communication links.

An alternate embodiment of the invention is to have two separate bottom antennas, one on each side of the vehicle's centerline. Thus, the invention can compare the profiles from the left and right antenna and therefore determine on which side of the road the RCIED is placed. This allows the system to be able to determine that information directly from one pass data. All the antennas could be connected to their own respective wideband. receiver subsystem 102B in the central processor 100 or continuously be switched to the input of one processor, thereby saving on the amount of hardware involved.

The use of radio controlled RCIED's in military theaters is growing. These weapons are perfect for insurgents or terrorist groups due to their low cost and low-tech natures. The need for a preventative technology to detect and locate the presence of such weapons along roadways and streets in real time is critical. This is especially true for U.S. and Coalition forces in theater today. In addition, this asymmetrical warfare technique will continue to be a problem long after the resent hostilities have subsided, as it has proven to be an effective technique against a larger occupying force.

The system will allow operators to detect the presence of RCIED's that are hidden and armed along those roadways in near real-time. Thus, the convoy behind the vehicle containing the invention can be alerted to the presence and location of the RCIED's. These weapons can then be disarmed before they are allowed to attack U.S. and Coalition forces, or the convoy can simply take a different route. Such a low profile "RCIED Street Sweeper" invention will be a critical preventive technology for any U.S. or Coalition military operation, and is therefore vital to the interests of U.S. national security.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A mobile detection system for a radio-controlled improvised explosive device (RCIED), said detection system comprising:

a first subsystem that receives signals from said RCIED, said first subsystem outputting a device signal amplitude for each of a predetermined set of frequency bins during each of a plurality of time periods;

a second subsystem that receives ambient signals, said second subsystem outputting an ambient signal amplitude for each of said predetermined set of frequency bins during each of said plurality of time periods, said second subsystem receiving less energy from said RCIED than said first subsystem; and a signal evaluation logic module that determines the presence of said RCIED by comparing said device signal amplitude to said ambient signal amplitude for each of said frequency bins for each of said plurality of time periods.

2. The system of claim 1, wherein said first subsystem and said second subsystem comprise first and second antennae respectively, said first antenna being mounted closer to said RCIED than said second.

3. The system of claim 2, wherein:

said system detects a distance traveled by said system between consecutive ones of said time periods; and uses said detected distance to determine a location for said RCIED.

4. The system of claim 3, wherein:

said system generates an alert detectable by the human senses responsive to said-system determining said location.

5. The system of claim 4, wherein said system comprises a GPS receiver that determines a globally-referenced position of said system.

6. The system of claim 5, wherein said alert includes said determined globally-referenced system position for said system.

7. The system of claim 1 wherein said first subsystem comprises a first receiver that receives and amplifies signals from said first antenna and said second subsystem comprises a second receiver that receives and amplifies signals from said second antenna, said first receiver being synchronized with said second receiver.

8. A method for detecting radio-controlled improvised explosive devices (RCIEDs), said method comprising:

collecting device RF signals from a first subsystem mounted to a mobile platform, said first subsystem receiving signals from an RCIED during each of a plurality of time periods;

simultaneously collecting ambient RF signals from a second subsystem mounted to said mobile platform, said second subsystem receiving ambient signals and less power from said RCIED than said first subsystem;

determining device signal amplitude for each of a predetermined set of frequency bins for said collected device RF signals;

determining ambient signal amplitude for each of said predetermined set of frequency bins for said collected ambient RF signals;

comparing the amplitude of said device RF signal to the amplitude of said ambient RF signal for each of said frequency bins; and recording said amplitudes and said corresponding frequency bins of said device RF signals responsive to said comparing.

9. The method of claim 8, further comprising:

moving said mobile platform during said signal collection;

detecting said platform movement; and associating said detected movement with said recorded amplitudes and said corresponding frequency bins of said device RF signals.

10. The method of claim 9, further comprising:

correlating said recorded amplitudes and said corresponding frequency bins of said device RF signals with predetermined amplitudes and corresponding frequency bins to determine a correlation value; and generating an alert detectable to the human senses when said correlation value exceeds a predetermined threshold.

11. The method of claim 10, further comprising:

detecting a global position of said mobile platform during each of said plurality of time intervals; and associating one said global platform position with each instance of said recording responsive to said comparing; and including one of said associated global platform positions in said generated alert.

12. The method of claim 8 wherein said RF signal collection comprises said first signal collection subsystem collecting said signals through a first antenna and said second signal collection subsystem collecting said signals through a second antenna, said first antenna being closer to said RCIED than said second.

13. The method of claim 12, wherein said first and second antennae are separated by at least two feet.

14. A vehicle-mounted radio-controlled improvised explosive device detection (RCIED) system, comprising:

a first subsystem that receives signals from an RCIED, said first subsystem outputting a device signal amplitude for each of a predetermined set of frequency bins during each of a plurality of time periods, said first subsystem being mounted to said vehicle, and said first subsystem comprising a first antenna for receiving RF signals, said first antenna mounted on said vehicle;

a second subsystem that receives ambient signals, said second subsystem outputting an ambient signal amplitude for each of said predetermined set of frequency bins during each of said plurality of time periods, said second subsystem receiving signals from above said vehicle, and said second subsystem comprising a second antenna for receiving RF signals, said second antenna receiving signals from below said vehicle and being further from said RCIED than said first antenna; and a signal evaluation logic module that determines the presence of the RCIED of interest by comparing said device signal amplitude to said ambient signal amplitude for each of said frequency bins for each of said plurality of time periods.

15. The vehicle-mounted system of claim 14, wherein:

said system generates an alert detectable by the human senses responsive to said-determined presence.

16. The vehicle-mounted system of claim 15, wherein:

said system further detects a distance traveled by said system between consecutive ones of said time periods; and uses said detected distance to determine the location of said RCIED of interest.

17. The vehicle-mounted system of claim 16, wherein said system uses GPS detection to determine a globally-referenced position of said system.

18. The vehicle-mounted system of claim 17, wherein said alert includes said determined globally-referenced system position for said system.

19. The vehicle-mounted system of claim 14 wherein said first subsystem comprises a first receiver that receives and amplifies signals from said first antenna and said second subsystem comprises a second receiver that receives and amplifies signals from said second antenna, said first receiver being synchronized with said second receiver.

* * * * *